United States Patent [19]

Ramer

[11] 4,132,356
[45] Jan. 2, 1979

[54] SOLAR HEATING FOR HOME USE

[76] Inventor: James L. Ramer, Rte. #1, Box 155, Sullivan, Mo. 63080

[21] Appl. No.: 739,167

[22] Filed: Nov. 5, 1976

Related U.S. Application Data

[62] Division of Ser. No. 668,333, Mar. 19, 1976, abandoned.

[51] Int. Cl.² ............................................. F24D 5/04
[52] U.S. Cl. .................................... 237/1 A; 165/101
[58] Field of Search .............. 237/1 A; 126/270, 271; 165/18, 47, 48, 101, 34, 35

[56] References Cited

U.S. PATENT DOCUMENTS

| | | | |
|---|---|---|---|
| 1,753,227 | 4/1930 | Wheeler et al. | 126/271 |
| 2,680,565 | 6/1954 | Löf | 165/18 |
| 3,254,702 | 6/1966 | Thomason | 165/104 S |
| 3,812,903 | 5/1974 | Thomason | 165/18 |
| 3,902,474 | 9/1975 | Pyle | 237/1 A |
| 3,990,914 | 11/1976 | Weinstein et al. | 126/271 |

Primary Examiner—Ronald H. Lazarus
Assistant Examiner—Sheldon Richter
Attorney, Agent, or Firm—Thomas O. Maser

[57] ABSTRACT

A system for using solar heat to supplement the heat supplied by a conventional furnace in a house. Solar energy collector panels include conduits for the flow of water, the conduits heating water in a cistern. Heated water from the cistern is pumped through a heat exchanger located in an auxiliary duct communicating with the duct system in the house, the duct system also being connected with the conventional furnace. An air valve is movable between positions closing communication between the auxiliary duct and the duct system, while leaving open the communication between the furnace and the duct system, and opening communication between the auxiliary duct and the duct system, while closing communication between the furnace and the duct, to thereby heat air in the duct system from the furnace or the solar-heated water, respectively.

5 Claims, 4 Drawing Figures

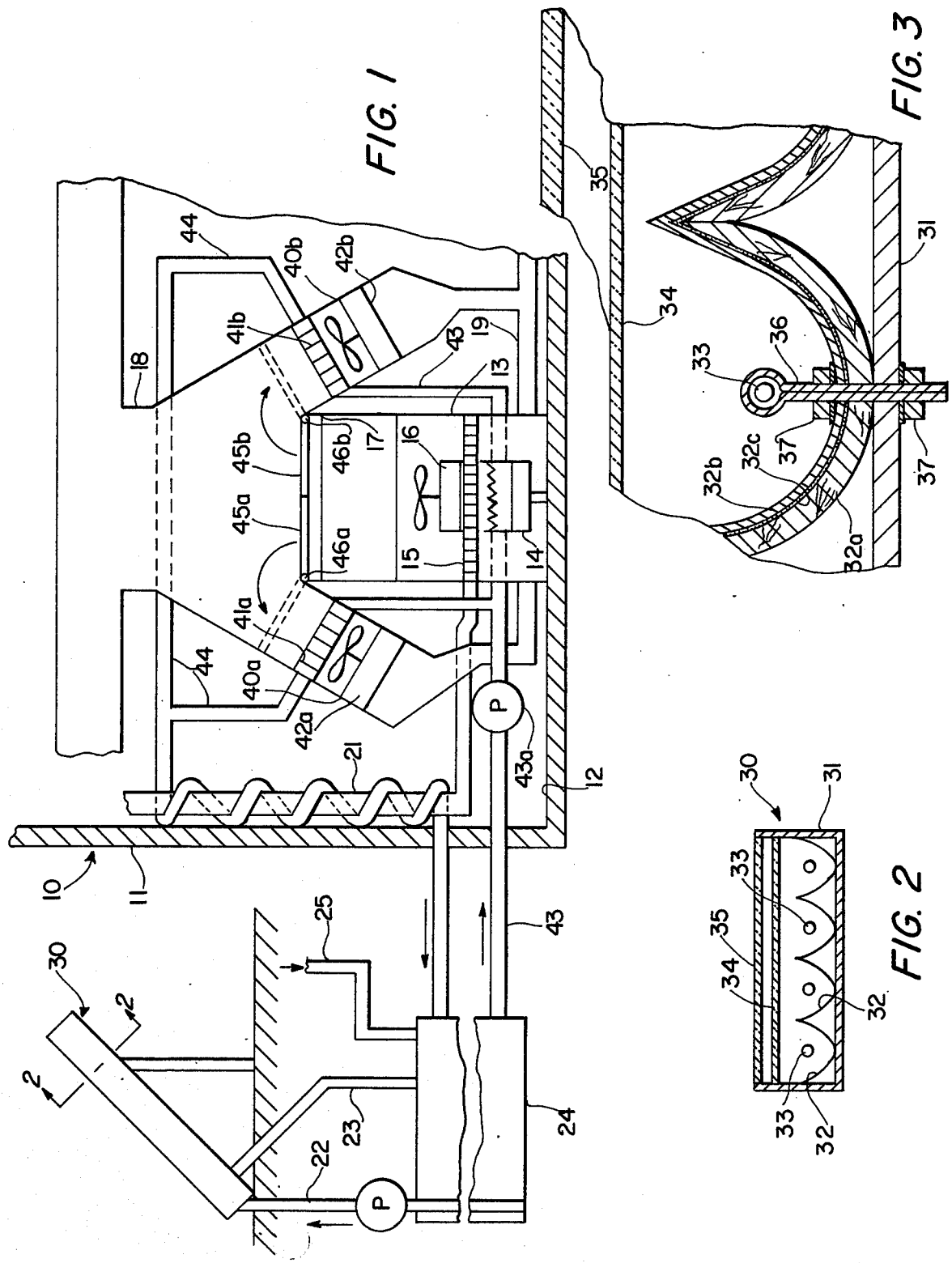

SOLAR HEATING FOR HOME USE

This is a division of application Ser. No. 668,333, filed Mar. 19, 1976, now abandoned.

SUMMARY OF FURTHER FEATURES

A solar energy collector panel comprises a frame having a plurality of adjacent reflectors therein, each comprising a longitudinally extending plywood element of transverse parabolic shape and covered on the concave surface with reflective foil; a conduit extends longitudinally in each reflector, located at the focus, the conduits being interconnected to provide a system with an inlet and an outlet. A transparent cover of plastic is attached to the frame, outwardly of a glass cover adjacent the frame to provide a dead air space and protect the glass cover.

In an alternate house cooling embodiment, the solar energy collector is a part of a conventional absorption refrigeration system, providing the heat energy input, the system having the evaporator thereof located in the cistern to cool the water therein, the cooled water being pumped from the cistern to the heat exchangers in the auxiliary ducts to provide house air conditioning.

BACKGROUND OF THE INVENTION

The present invention relates to the field of solar energy for home heat and cooling, and more particularly to a solar energy system for adding to and supplementing home heating where a fossil fuel furnace is connected to an air duct system that extends throughout the house, and the present invention also relates to a particular solar heat collector, as well as to a solar energy cooling system that may be added to an existing structure of the type noted.

Solar energy systems have been proposed for use in connection with the heating and, in addition, the cooling of structures such as houses for many decades, and in the past decade, activity along this line has been greatly accelerated. Few of the proposals which have gone before have, however, addressed themselves to the utilization of solar energy by a construction which can be accomplished using, primarily, readily available parts and tools, so that in the past, many of the proposals have required that a significant part of the construction thereof be of factory provided components. Further, the known constructions have not provided a construction which could be readily added to existing fossil fuel furnace and air duct system constructions.

In one known construction in the prior art, a solar collector was utilized for heating air, which was then passed through an air duct to the furnace, so as to be introduced into the inlet of the supply duct system of the house. This system was not adaptable to existing structures because of the need to add a large duct extending from the heat collector to the furnace, which were usually arranged on the roof, and in the basement, respectively.

In another prior art suggestion, it was proposed to provide a solar energy collector on the roof, for heating water, which was delivered to a tank, so as to heat water in the tank; the water in the tank was circulated to a heat exchanger, broadly suggested as being located in or adjacent the furnace, but without any specific suggestion of the interrelationship between the heat exchanger and the furnace.

In another prior art suggestion, a solar heater was used to provide heat to the water in a tank, and additional air ducts were extended from the furnace around the tank, so as to pick up the heat from the water in the tank, thereby requiring extensive additional ducting.

In connection with known solar energy collectors, while the prior art has suggested reflector channels in which a fluid conduit was positioned, the suggestions in the prior art have not been of constructions which could be readily made without requiring unusual skill, equipment, or parts.

Among the objects of the present invention are to provide a solar energy system which may be added to existing houses which have a fossil fuel furnace and an air duct system, and to provide such a system which, when installed, may be readily converted so as to utilize either solar energy, if available, or fossil fuel energy.

Another object of the present invention is the provision of an auxiliary or additional solar energy system of the kind described, which can be fabricated without requiring expensive tools, or parts which are required to be manufactured in a factory-type installation.

Another object of the present invention is to provide a solar energy collector which is efficient in operation, simple to make, and which can be fabricated from conventional and readily available tools and parts.

Yet another object of the present invention is the provision of a cooling system adjunct for a house for enabling the system to be constructed and installed utilizing conventional cooling, and requiring only the acquisition of an absorption type refrigeration system.

SUMMARY OF THE INVENTION

A solar energy collector is provided for heating a liquid, preferably water, which is transferred to a cistern by a closed-circuit system. This serves to heat the water in the cistern, which is pumped to a pair of heat exchangers located adjacent to the existing duct system in a house, and more particularly, adjacent the inlet of the supply duct, adjacent the conventional fossil fuel furnace. The heat exchangers are each located in an auxiliary duct, which communicates with the supply duct, being connected to it at an angle. A pair of gate valves or similar closures are provided, each of which may occupy a first position in which it closes off communication between the auxiliary duct and the supply duct, while leaving open the communication path into the supply duct from the furnace, or the supply duct inlet. In its other position, each of the gate valves closes one-half of the supply duct inlet, while leaving open the communication between the auxiliary duct and the supply duct. The gate valves are preferably mounted on support pivots, located at the juncture of the auxiliary duct and the supply duct, and movable due to the force of air being pushed through either the supply duct inlet by the conventional furnace system blower, or by air blown by auxiliary blowers in the auxiliary ducts.

The solar energy collector panel comprises a plurality of reflectors, each made of a sheet of plywood bent into a parabolic shape, and held in a surrounding frame, there being a plurality of such transverse parabolic shape and longitudinally extending plywood elements. These are covered with a reflective substance, and in particular aluminum foil which is suitably adherred to the concave surfaces of these elements. Eyebolts are used to mount liquid conduits at the focus of the respective reflectors, and a glass cover is provided over the frame and the reflectors. In addition, a plastic cover is provided extending in spaced relation to the glass cover and outwardly thereof, but also being hermetically joined to the glass or to the frame, to thereby provide a dead air space between the plastic cover and the glass, for better insulation. In addition, the plastic cover serves as a protection against damage to the glass cover as by rocks, ice, etc.

A solar-energized system for cooling the house is also contemplated, there being provided an absorption refrigeration system having the evaporator thereof in the aforementioned cistern, with the solar energy collector serving as the heat input source for the cistern. In this case, the water in the cistern is cooled, and the cooled water is transferred to the aforementioned heat exchangers in the auxiliary ducts, so that air passing over these heat exchangers and thence into the supply duct system will enable cooled air to be distributed throughout the house.

BRIEF DESCRIPTION OF THE DRAWINGS

FIG. 1 is a schematic view, partly in section, of a solar energy heating system in accordance with the present invention.

FIG. 2 is a cross-sectional view taken on the line 2—2 of FIG. 1.

FIG. 3 is an enlarged cross-sectional view of a portion of FIG. 2, and showing details of the heat collector.

DESCRIPTION OF THE PREFERRED EMBODIMENT

Figure 4:
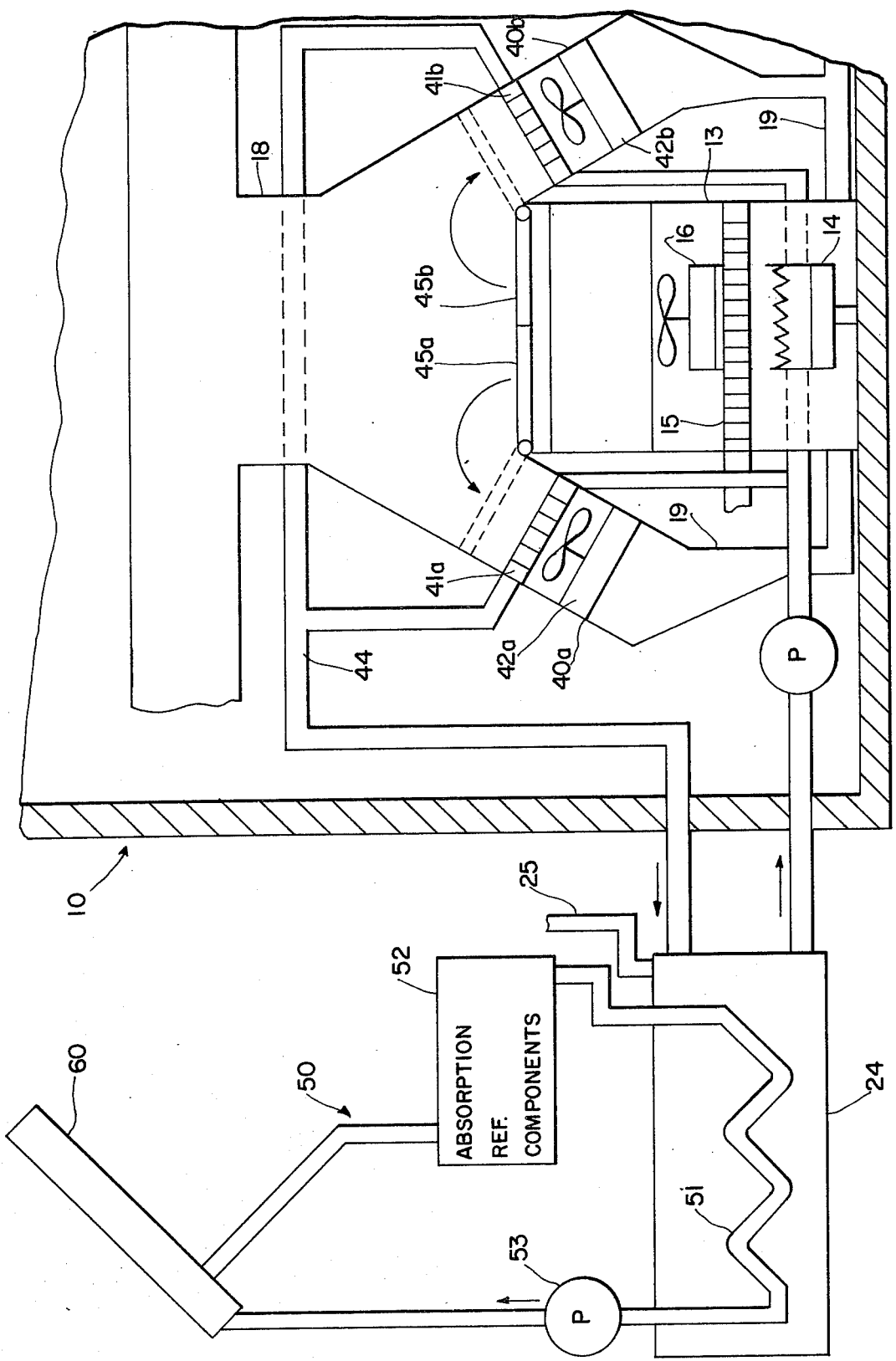
FIG. 4 is a schematic view, similar to FIG. 1, and showing an embodiment for home cooling.

Referring now to the drawings, wherein like or corresponding reference numerals are used to designate like or corresponding parts throughout the several views, there is shown a portion of a house 10, including a wall 11 and a floor 12. On the floor 12 is a conventional fossil fuel furnace 13, including a burner 14 and a heat exchanger 15. A blower 16 is provided, in known fashion, typically including an air impeller and a motor, for delivering heated air to the inlet 17 of a supply duct 18. Supply duct 18, in conventional manner, has branches extending to various rooms in the house (not shown) and there is provided as a part of the duct system of the house a return duct 19 which is connected to the furnace in known manner. The products of combustion from the burner 14 pass through the heat exchanger 15, in heat exchange relationship with the air supplied by the return duct 19, and these products of combustion then pass to a chimney or stack 21.

A heat collector generally designated 30, is provided, the preferred construction of which will be set forth hereinbelow. The heat collector 30 is supplied with water through a supply pipe 22, the heated water being delivered to a return conduit 23, both the inlet pipe 22 and return conduit 23 being connected with a cistern 24. Cistern 24 is a tank of suitable construction, and insulated in known manner, against heat loss. Makeup water, for any loss of water within the system, may be supplied through a makeup water pipe 25 connected to the cistern 24. The makeup pipe 25 may be connected to a suitable source of water, such as the water supply mains.

A pair of auxiliary ducts 40a and 40b are provided on opposite sides of the supply duct 18, shown just down stream of the inlet 19 thereof. The auxiliary ducts 40a and 40b are shown as being in angular relationship to the supply duct 18, and each includes therein a heat exchanger 41a and 41b, respectively. Blowers 42a and 42b are provided upstream of the heat exchangers, and are schematically shown as electric motor-driven propellers, although it will be understood that any suitable form of blowers may be used. The inlets of the auxiliary ducts 40a and 40b are connected with the air return duct 19, as shown.

The heat exchangers 41a and 41b are supplied with water through the water supply pipe 43 connected through a pump 43a to the cistern 24, and each heat exchanger 41a and 41b is connected by a return pipe 44 to the cistern 24, the return pipe 44 being in heat exchange relationship with the exhaust stack 21 from the burner 41, so as to thereby transfer exhaust heat to the water in the return pipe 44, which exhaust heat would otherwise be wasted.

A pair of gates 45a and 45b are provided, having pivot supports 46a and 46b located at the junctures between the auxiliary ducts 40a and 40b and the supply duct 18. In the position of the gates 45a and 45b shown, they close off the communication between the inlet 17 of the supply duct, and the supply duct 18, due to the fact that the gates have a suitable size and shape to substantially completely close off the inlet 17. In their alternate positions, the gates 45a and 45b will close off communication between the auxiliary ducts 40a and 40b and the supply duct 18, this being shown by dash lines in FIG. 1.

As will be understood, while the pivots 46a and 46b are shown as being horizontal, the auxiliary ducts are preferably horizontal so that the pivots 46a and 46b are vertical. In that way, the gates may be moved from one position to the other, and back, by actuation of the air, caused to blow by either the blower 16, or the blowers 42a and 42b. Thus, when utilizing the fossil fuel furnace including the burner 14, the blower 16 will cause the gates 45a and 45b to move to the dash line positions shown in FIG. 1, while when the heat is to be derived from the heat exchangers 41a and 41b, the blowers 42a and 42b are energized, which not only cause passage of air through the auxiliary ducts 40a and 40b, but also cause the gates 45a and 45b to move to the full line positions shown in FIG. 1.

Referring now to FIGS. 2 and 3, the solar heat collector 30 is shown in cross-section, and comprises a box-like frame 31, and a plurality of parallel, longitudinally extending reflectors 32 which are in adjacent relationship, the reflectors 32 having, as shown, a transverse parabolic shape. A conduit 33 is provided at the focus of each reflector 32, and a glass cover 34 is positioned over the reflectors 32 and conduits 33. In addition, a plastic cover 35 is provided which is hermetically sealed to the frame 31, or possibly to the glass cover 34, to thereby provide a dead air space between the glass cover 34 and the plastic cover 35, and also to provide protection for the glass cover 34 against breakage if struck by an object. The plastic cover should preferably be essentially flat to minimize optical distortion of the rays passing therethrough.

Referring now to FIG. 3 in particular, the reflector 32 may be seen to comprise a plywood strip 32a which is bent in the aforesaid parabolic transverse cross-sectional shape. A reflective aluminum foil 32b is adhered to the concave surface of the plywood strip 32a by a layer of adhesive 32c. The conduit 33 is supported at the focus of the parabola by an eyebolt which passes through the plywood strip 32a and the bottom plate of the frame 31, being secured in position by suitable nuts 37. Due to the threading on the eyebolt 36, and with the provision of the limited horizontal slotting transverse to the cross-sectional shape of the parabolic reflecting surface 32a and the supporting frame 31, the position of the conduit 33 may be readily established at the focus of the reflector 32.

Referring now to FIG. 4, there may be seen a generally similar arrangement, including the building 10, furnace 13 and burner 14, together with heat exchanger 15 and blower 16. There are also provided the supply duct 18, return duct 19, and auxiliary ducts 40a and 40b, with heat exchangers 41a and 41b, together with blowers 42a and 42b. The auxiliary ducts 41 and the gate 45 cooperate in the same manner as in FIG. 1.

In the embodiment of FIG. 4, however, there is provided an absorption refrigeration system, generally designated 50, and including an evaporator 51 in the cistern 24, so as to provide for cooling of the water in cistern 24. The heat input into the absorption refrigeration system 50 is provided by a solar energy collector 60, which serves as the source of heat input required for the absorption refrigeration system 50. Generally designated 52 are the other conventional components of the absorption refrigeration system 50, which are well known in the art, there also being provided the necessary pump 53 for the system 50. By this construction, the heat of the sun may be used to supply the energy for the heat exchangers 41a and 41b which serve to supply cooled air to the house 10 through the supply ducts 18. As will be appreciated, the return pipe 44 will not be in heat exchange relationship with the exhaust stack from the furnace 13, which is, for clarity, not shown in FIG. 4.

As will be understood, the system of FIG. 1 and FIG. 4 may be used together in the same house. Thus, there may be provided both the solar energy collectors 30 and 60, and their attendant structures as illustrated, or by the provision of suitable piping and valves, a single set of solar energy collectors may be used alternately for heating either water or the refrigerant in the case of the refrigeration system 50. This would involve, however, a necessary cleaning and purging operation to convert from water heating, for auxiliary heating to and from refrigerant heating for air conditioning.

There has been provided a system for providing solar heat to supplement a conventional furnace-hot air building heating system which may be used to modify an existing building construction in an effective and efficient manner, providing a highly efficient system, but requiring only conventional, simple tools and readily obtained equipment and parts. The solar auxiliary heating system herein disclosed permits the ready and rapid change over from fossil fuel to and from solar energy, as the alternate source of heat.

There has also been herein disclosed a highly efficient solar energy collector which is extremely simple to make, utilizing only conventional tools, and requiring no factory made parts.

Further, there has been provided an effective and efficient cooling system which may be added to a conventional furnace-hot air duct system, with simple equipment and minimal cost, requiring only the obtaining of a standard absorption refrigeration system.

While the invention has been described with reference to a preferred embodiment thereof, it should be understood that variations or modifications may be easily made by those skilled in the art without departing from the scope of the invention which is defined by the appended claims.

What is claimed is:

1. A system for providing solar heat to supplement a conventional furnace hot air building heating system comprising:
   (a) solar heat collector means for heating a liquid by solar radiation,
   (b) a furnace for heating air,
   (c) a supply duct system connected to the furnace to receive heated air therefrom,
   (d) auxiliary duct means connected to said supply duct system,
   (e) heat exchange means in said auxiliary duct means,
   (f) means connecting said heat exchanger means to said solar heat collector means for transfer of heat energy to said heat exchange means from said solar heat collector, and
   (g) means for alternately closing communication between said auxiliary duct means and said supply duct system and leaving open the communication between said furnace and said supply duct system, and closing communication between said furnace and said supply duct system and leaving open communication between said auxiliary duct means and said supply duct system.

2. The system of claim 1, wherein said last mentioned means comprises gate means alternately movable between a first position closing communication between said supply duct system and said furnace and a second position closing communication between said supply duct system and said auxiliary duct means.

3. The system of claim 2, wherein said auxiliary duct means is connected in angular relation to a portion of the supply duct means, and pivot support means for said gate means located at the juncture of said auxiliary duct means and said portion of said supply duct means.

4. A system for providing solar heat to supplement a conventional furnace hot air building heating system comprising:
   (a) solar heat collector means for heating a liquid by solar radiation,
   (b) a furnace for heating air,
   (c) a supply duct system connected to the furnace to receive heated air therefrom,
   (d) auxiliary duct means comprising a pair of ducts on opposite sides of, and connected in angular relation to, a portion of said supply duct means,
   (e) heat exchange means in said auxiliary duct means,
   (f) means connecting said heat exchange means to said solar heat collector means for transfer of heat energy to said heat exchange means from said solar heat collector, and
   (g) a pair of gates, each gate having a size and shape alternately to close off the auxiliary duct means and a portion of said supply duct means at its connection to the furnace, each gate further having pivot support means located at the juncture of said auxiliary duct means and said portion of said supply duct means, said gates being alternately movable between a first position for closing communication between said auxiliary duct means and said supply duct system and leaving open the communication between said furnace and said supply duct system, and a second position for closing communication between said furnace and said supply duct system and leaving open communication between said auxiliary duct means and said supply duct system.

5. A system for providing a solar heat to supplement a conventional furnace hot air building heating system comprising:

(a) solar heat collector means for heating a liquid by solar radiation,
(b) a furnace for heating air,
(c) a supply duct system connected to the furnace to receive heated air therefrom,
(d) auxiliary duct means connected to said supply duct system,
(e) heat exchange means in said auxiliary duct means,
(f) a furnace exhaust stack, the return line of said heat exchange means being in heat exchange relation therewith,
(g) means connecting said heat exchange means to said solar heat collector means for transfer of heat energy to said heat exchange means from said solar heat collector, and
(h) means for alternately closing communication between said auxiliary duct means and said supply duct system and leaving open the communication between said furnace and said supply duct system, and closing communication between said furnace and said supply duct system and leaving open communication between said auxiliary duct means and said supply duct system.

* * * * *